US012662319B2

(12) United States Patent　　　　(10) Patent No.:　US 12,662,319 B2
　　　Zirpoli　　　　　　　　　　　　 (45) Date of Patent:　　Jun. 23, 2026

(54) LIFTING CONVEYOR BELT

(71) Applicant: STM INDUSTRIALE S.P.A., Naples (IT)

(72) Inventor: Antonio Zirpoli, Vietri di Potenza (IT)

(73) Assignee: STM INDUSTRIALE S.P.A., Naples (IT)

( * ) Notice: Subject to any disclaimer, the term of this patent is extended or adjusted under 35 U.S.C. 154(b) by 65 days.

(21) Appl. No.: 18/724,928

(22) PCT Filed: Dec. 29, 2022

(86) PCT No.: PCT/IB2022/062874
　　　§ 371 (c)(1),
　　　(2) Date: Jun. 27, 2024

(87) PCT Pub. No.: WO2023/126870
　　　PCT Pub. Date: Jul. 6, 2023

(65) Prior Publication Data
　　　US 2025/0066130 A1　　　Feb. 27, 2025

(30) Foreign Application Priority Data
　　　Dec. 29, 2021　　(IT) ........................ 102021000033014

(51) Int. Cl.
　　　*B65G 15/16*　　　　(2006.01)
　　　*B65G 15/44*　　　　(2006.01)
(52) U.S. Cl.
　　　CPC ............. *B65G 15/16* (2013.01); *B65G 15/44* (2013.01); *B65G 2201/04* (2013.01)
(58) Field of Classification Search
　　　CPC ........ B65G 15/14; B65G 15/16; B65G 15/42; B65G 15/44

(Continued)

(56) References Cited

U.S. PATENT DOCUMENTS 3,881,590 A * 5/1975 Hartmann ............... B65G 15/14
　　　　　　　　　　　　　　　　　　　　　 198/716
3,982,626 A * 9/1976 Mehta .................... B65G 15/14
　　　　　　　　　　　　　　　　　　　　　 198/626.2

(Continued)

FOREIGN PATENT DOCUMENTS

DE　　　　 2631643 A1　　 5/1978
JP　　　　 H1087044 A　　 4/1998

OTHER PUBLICATIONS

Translation of DE 2631643 (Year: 1978).*

(Continued)

*Primary Examiner* — Mark A Deuble
(74) *Attorney, Agent, or Firm* — Nixon & Vanderhye

(57) ABSTRACT

The invention is an elevator conveyor belt (1) suited to promote the handling of materials M, comprising: a supporting structure (2): a first transport element (3) anchored to the structure (2) and having a first flat surface (4) intended to support the material (M), said first flat surface (4) extending continuously along a longitudinal extension direction (L) between a loading area (Zc) and an unloading area (Zs): handling means (9) anchored to the supporting structure (2) to promote the controlled movement of the first transport element (3) along a direction of advance (A) substantially parallel to said longitudinal extension direction (L). During the operation of the handling means (9), the material (M) is loaded onto, and respectively unloaded from the first transport element (3) at the loading area Zc, and respectively at the unloading area (Zs). There is a second transport element (14) placed over at least one portion of the first transport element (3), said second transport element (14) being provided with a plurality of substantially transverse crosspieces (15) suited to be arranged over the first flat surface (4) of the first transport element (3) so as to interact with the material (Continued)

(M) and guide it during transport from the loading area (Zc) to the unloading area (Zs).

14 Claims, 3 Drawing Sheets

(58) Field of Classification Search
USPC ................ 198/626.1–626.6, 698–699, 690.2
See application file for complete search history.

(56) References Cited

U.S. PATENT DOCUMENTS

| | | | | | |
|---|---|---|---|---|---|
| 4,225,034 | A | * | 9/1980 | Sarovich | ................ B65G 17/12 |
| | | | | | 198/698 |
| 4,664,251 | A | * | 5/1987 | Gough | ................... B65G 15/16 |
| | | | | | 198/836.2 |
| 4,666,032 | A | * | 5/1987 | Gough | ............... B65G 21/2054 |
| | | | | | 198/690.2 |
| 5,186,310 | A | * | 2/1993 | Winchester | ............ B65G 17/26 |
| | | | | | 198/626.5 |
| 5,392,897 | A | * | 2/1995 | Akesaka | ................ B65G 15/14 |
| | | | | | 198/607 |
| 5,435,433 | A | * | 7/1995 | Jordan | ................... B65G 15/14 |
| | | | | | 198/626.5 |
| 2008/0053796 | A1 | | 3/2008 | Depaso et al. | |

OTHER PUBLICATIONS

International Search Report for PCT/IB2022/062874 dated Jun. 14, 2023, 3 pages.
Written Opinion of the ISA for PCT/IB2022/062874 dated Jun. 14, 2023, 6 pages.

* cited by examiner

LIFTING CONVEYOR BELT

CROSS-REFERENCE TO RELATED APPLICATIONS

This application is the U.S. national phase of International Application No. PCT/IB2022/062874 filed Dec. 29, 2022 which designated the U.S. and claims priority to IT Patent Application No. 102021000033014 filed Dec. 29, 2021, the entire contents of each of which are hereby incorporated by reference.

Field of Application of the Invention

The present invention concerns the technical field of conveyor belts and more specifically it concerns an elevator conveyor belt suited to promote the transfer of solid and semi-solid materials, including those with large grain size and high flow rate, from mineral deposits, traditional underground excavations or mechanized tunneling with TBMs, quarries, port facilities for loading and unloading ships, production processes in the food industry, waste-to-energy plants, cement factories, sugar refineries, steel mills, biomass treatment plants, refineries, and process industries in general.

STATE OF THE ART

As is known, conveyor belts are widely used in many technical fields to promote the continuous and automated movement of materials along a predetermined direction of advance.

Most conveyor belts available on the market are provided with a flat and continuous surface suited to support the materials to be transported between a collection point and an unloading point.

The belt is operatively connected to one or more driving drums, the latter being set rotating by means of mechanical devices for the transmission of motion (for example, a belt-pulley system or a device with gears) associated with one or more electric motors.

The activation of the electric motor generates the selective movement of the transmission device, which can thus transfer motion to the belt, making it advance along a predetermined direction.

Elevator belts constitute a particular type of conveyor belts.

Typical applications for these particular belts are those related to the disposal of excavated material formed during the drilling of underground passages, shafts, substations and/or tunnels, to the transfer of materials in general for the filling of silos, tanks and storage domes, to the loading and unloading of ship holds used to transport bulk materials such as coal, sulfur, clinker, ore, pet-coke, urea, etc., and to the feeding of industrial furnaces. More generally, all those applications requiring the transfer of material in a vertical or almost vertical direction, even to considerable heights.

One of the many examples of application of elevator conveyor belts concerns the disposal of the earthy or rocky material formed during the construction of subways, underground tunnels or other underground passages.

In this type of belt, the excavated material is handled from a collection point, generally located below the ground surface near the excavation area, to an unloading point, generally located above the external ground surface.

The movement of the excavated material therefore follows a substantially vertical direction of movement, and for this reason the surface of the belt is steeply inclined with respect to the horizontal so as to promote the upward movement of the material from a very deep area to the ground surface.

The transport surface used in these devices comprises a plurality of crosspieces (or cross members) designed to prevent the material from falling or sliding downwards during the operation of the belt.

These crosspieces are generally cured onto the flat outer surface of the belt.

More specifically, the crosspieces extend along a direction that lies substantially crosswise with respect to the direction of advance of the belt and are distributed along the entire extension of the belt.

The crosspieces are generally staggered with respect to one another in a substantially even manner and therefore with a constant pitch.

This specific configuration of conveyor belts has a number of drawbacks that make them difficult to use for transporting adhesive and very compact material, as is the case in the specific technical field of underground excavations.

Excavated material, in fact, is frequently wet and its physical properties are similar to those of sludge (mixture of water, earth and rock).

During transport from bottom to top, the part of the excavated material in contact with the surface of the belt has a high capacity to adhere to the surface itself; in other words, the excavated material "sticks" to this surface and a "sticking" effect is substantially produced between these two elements.

This makes it difficult to remove the excavated material from the belt surface when the latter has reached the unloading point.

In fact, it is known that the separation of the excavated material from the conveyor belt takes place by gravity; however, the high adhesion capacity that characterizes the muddy excavated material prevents the latter from falling at the collection point and, on the contrary, keeps it stuck to the belt even during the return course (that is, the path from the unloading point to the collection point).

This fact is rather disadvantageous, as the increasing accumulation of collected material on the external surface of the belt limits the capacity of the latter and forces operators to schedule frequent maintenance to clean the belt.

The presence of the crosspieces, furthermore, makes it difficult (if not absolutely impossible) to install continuous belt cleaning devices, such as scraping systems or rotating brushes acting on the outer surface of the belt to detach the material stuck to it.

The drawbacks described above make it difficult to clean the elevator belt properly, which can limit the use of these belts in applications where materials with medium and high adhesion capacity need to be transported, such as on construction sites where underground drilling is carried out.

The elevator belts designed in this way also have the additional drawback of not providing suitable protection from falling material during its transport at a height.

In fact, portions of the material which, due to their intrinsic medium-high adhesiveness properties, remain "stuck" to the return section of the belt may subsequently fall downwards during motion; this circumstance, in addition to being potentially dangerous for an operator in the vicinity of the belt, may cause the material to accumulate along the areas under the elevator belt, at points different from the collection point.

This material, however, must subsequently be conveyed to the collection point, with a consequent increase in the costs associated with the disposal of the materials that fell downwards along the return section of the belt, as well as an increase in the time necessary to completely clear the site of the excavated material.

Documents DE 26 31 643, JP H10 87044 and US 2008/053796 describe conveyor belts equipped with a first flat transport element and a second transport element, superimposed on the first one and provided with a plurality of crosspieces. However, the belts described in these documents have rather rigid crosspieces that can easily cause jamming or stress with respect to the flat transport element. Furthermore, this configuration of the crosspieces is characterized by their limited capacity to adapt their shape with respect to the shape of the material that must be transported by the device.

PRESENTATION OF THE INVENTION

The present invention intends to overcome the technical drawbacks mentioned above by providing a particularly innovative and high-performance elevator conveyor belt.

More specifically, the main object of the present invention is to provide an elevator conveyor belt that is capable of maintaining a high degree of cleanliness over time, as it makes it possible to install those conventional systems that can guarantee the level of cleanliness that is typical of conventional conveyor belts.

A further object of the present invention is to provide a conveyor belt that allows the quantity of material transferred to be increased over time compared to currently known belts, thus increasing the productivity of the conveyor system.

A further object of the present invention is to provide an elevator conveyor belt that has a high degree of flexibility during use and that can be used for transporting and/or disposing of several types of material, possibly including a high quantity of liquids with respect to their total weight, having the consistency of the materials that tend to be liquid, such as sludge and sewage.

Another object of the present invention is to provide an elevator conveyor belt that is capable of increasing the safety of the operators working around the belt itself.

It is another, yet not the least object of the present invention to provide an elevator conveyor belt that is relatively simple to manufacture and such that it requires a reduced number of maintenance operations over time.

These objects, together with others that are better clarified below, are achieved by an elevator conveyor belt of the type.

Other objects that are better described below are achieved by an elevator conveyor belt according to the dependent claims.

BRIEF DESCRIPTION OF THE DRAWINGS

The advantages and characteristics of the present invention will become clear from the following detailed description of some preferred but not limiting configurations of an elevator conveyor belt, referring in particular to the following drawings.

DETAILED DESCRIPTION OF THE INVENTION

Figure 1:
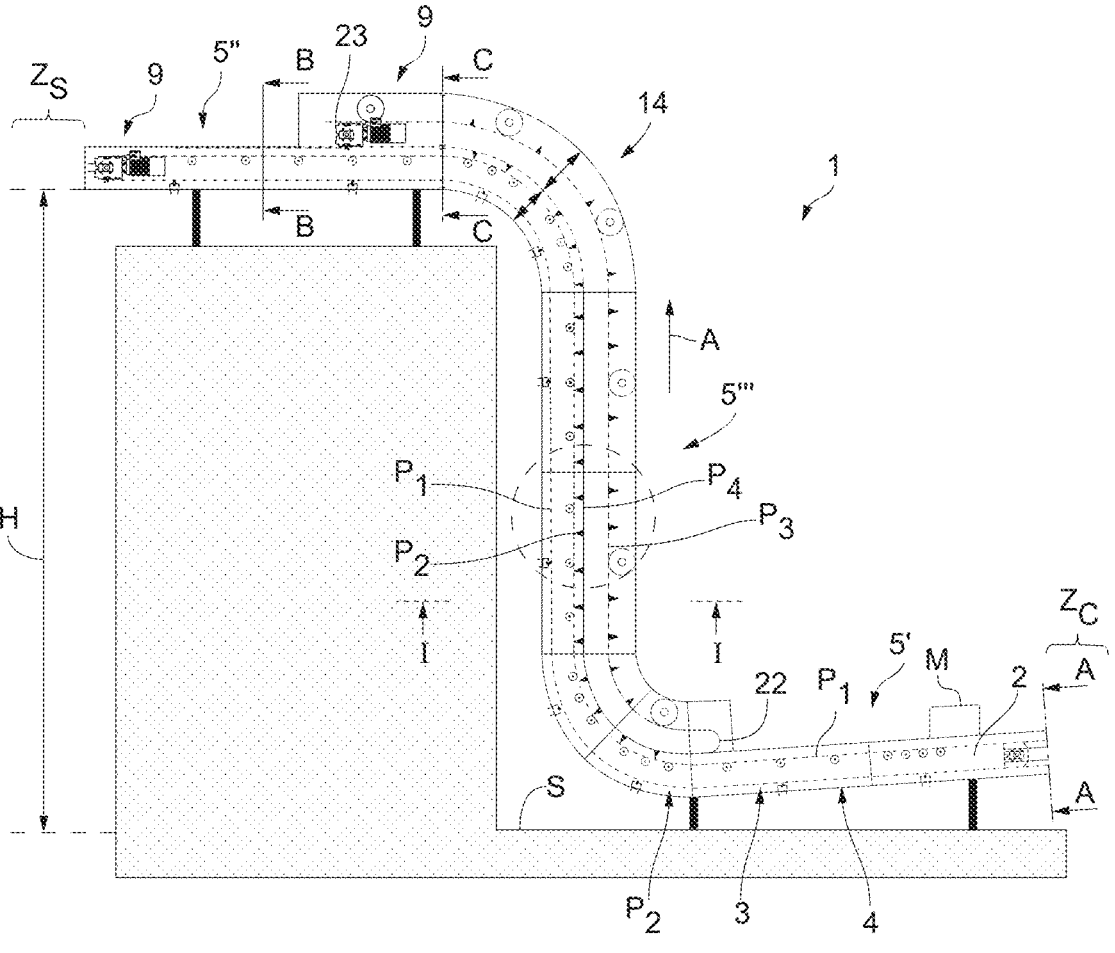
FIG. 1 shows a side view of an elevator conveyor belt according to the invention.

The subject of the invention concerns an elevator conveyor belt that is indicated by reference number 1 in the rest of the present description.

More specifically, this belt 1 can be suited to promote the handling of material M of various types between a loading area Zc and an unloading area Zs.

In this specific case, the belt 1 is configured to collect the material M at a loading area Zc where said material M has been accumulated or previously conveyed.

The function of this belt 1 is to transport the material M from the loading area Zc to an unloading area Zs where said material M is released.

This belt 1 falls within the category of elevator belts, meaning conveyor belts configured to transport the material M from a loading area Zc to an unloading area Zs that is situated at a considerably different height with respect to the position of the loading area Zc.

In the configuration of the belt 1 illustrated in the Figures, the unloading area Zs is at a greater height H with respect to the level of the loading area Zc and, therefore, during the operation of the belt 1, the material M to be transported is lifted.

Specifically, this belt 1 is particularly suited to be installed in underground construction sites to promote the transport of the material M generated during underground work up to the surface.

For example, the belt 1 can be used to transport up to the surface the excavated material M generated during the construction of tunnels, underground passages or other similar passages.

The excavated material M can be of the homogeneous or heterogeneous type.

In the present description, the term "homogeneous" refers to a material M mostly consisting of a single type of component; for example, dry earth, stones, pebbles or other similar materials.

In most practical cases, however, the excavated material M is of the "heterogeneous" type, that is, it is made up of a plurality of different components.

The heterogeneous materials M commonly found during underground excavation activities consist of a mixture of soil, stones (or other minerals), water and/or other liquids.

In this case, therefore, the excavated material M has a substantially muddy consistency and high viscosity.

Due to its high viscosity, the material M has a relatively high capacity to adhere to surfaces.

The material M adhering to the surfaces of a belt can cause serious drawbacks during the operation of the latter.

The main object of the invention described below is to overcome the drawbacks resulting from the transport of highly viscous material M by providing an elevator belt 1 capable of transporting heterogeneous material of any type.

The elevator conveyor belt 1 that is the subject of the present invention comprises a supporting structure 2 suited to be rested on the ground S and intended to support all the components of the belt 1.

A first transport element 3 anchored to the supporting structure 2 is also provided.

The transport element 3 has a first flat surface 4 that extends continuously along a longitudinal extension direction L.

In particular, the first flat surface 4 can extend seamlessly between the loading area Zc of the material M to be transported and the unloading area Zs of the transported material M.

As can be better seen in FIG. 1, the first transport element 3 can consist of a substantially closed belt element extending between the loading area Zc and the unloading area Zs.

In this way, therefore, the first flat surface 4 forms a course that is closed at its ends, which are respectively located in the loading area Zc and in the unloading area Zs.

Figure 3:
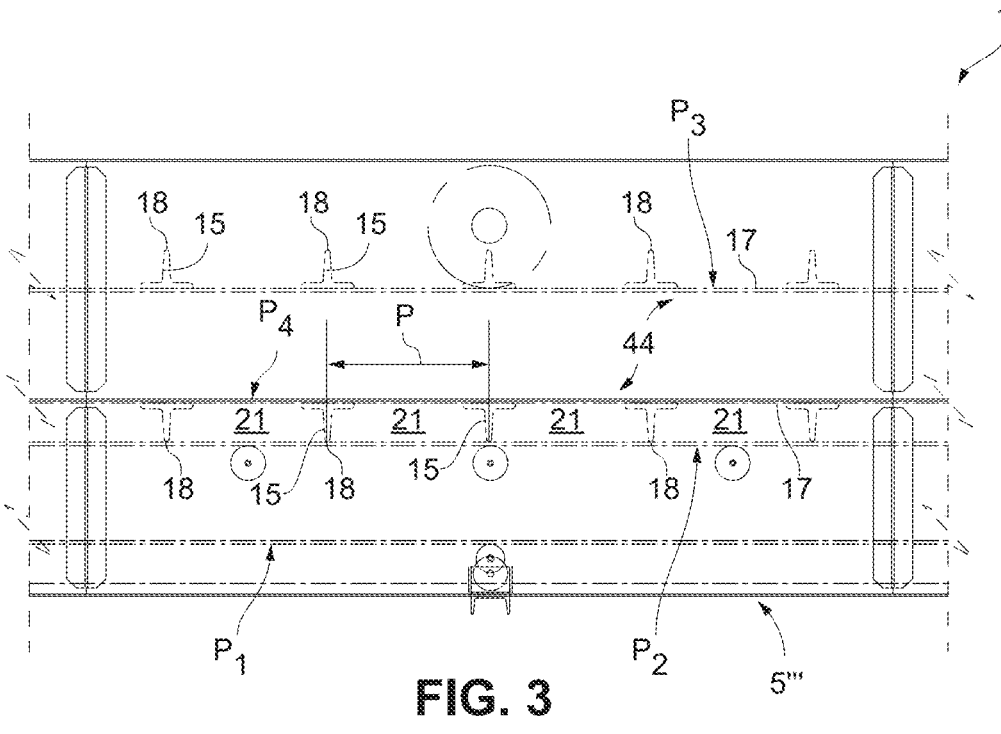
FIG. 3 shows an enlarged view of a detail of FIG. 1.

Consequently, the first flat surface 4 of the first transport element 3 extends on two substantially parallel courses, indicated by P1, P2 in FIG. 1 and FIG. 3.

The upper course P1 defines a route of the first flat surface 4 suited to support the material M, extending from the loading area Zc to the unloading area Zs.

The lower course P2 defines the return route of the first surface 4 from the unloading area Zs to the loading area Zc and along this section the first surface 4 does not interact with the material M to be transported.

The first transport element 3 can have substantially horizontal (or slightly inclined) sections 5', 5" located in proximity to the loading area Zc and the unloading area Zs as well as a substantially vertical section 5" suited to connect the two horizontal sections 5', 5" to each other.

This configuration is clearly visible in FIG. 1, where it is possible to notice the difference in height H that separates the loading area Zc from the unloading area Zs.

The side view of the belt 1 visible in FIG. 1 makes it possible to notice the "segmented" shape of the first transport element 3 as each section 5', 5", 5" is at a different level (height) with respect to the vertical direction (or with respect to the lowest point on the ground where the first section 5' rests).

Figure 2:
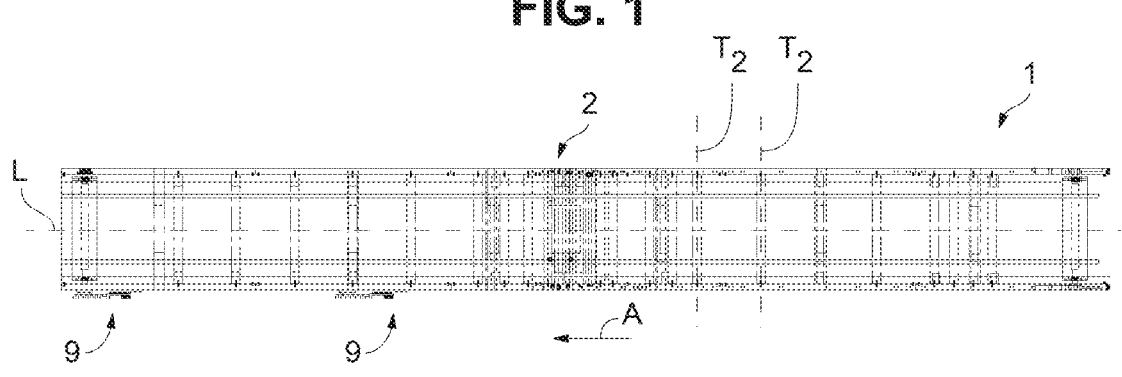
FIG. 2 shows a top view of the elevator conveyor belt of FIG. 1.

However, a top view of the belt 1, visible in FIG. 2, makes it possible to notice the continuous extension of the first transport element 3 along a single longitudinal direction of extension L.

Although the different sections 5', 5", 5"" of the belt 1 are located at different heights, the top view allows a single longitudinal extension direction L to be defined for all these sections, wherein the first transport element 3 extends along said direction between the loading area Zc and the unloading area Zs.

It is possible to summarize this configuration by stating that the belt sections 5', 5", 5" are positioned at different heights with respect to a substantially vertical centreline plane (not illustrated in the figures), while the longitudinal direction of extension L is substantially the same for all the sections of the element 5 and, independently of the height of each section 5', 5", 5", it can lie on a substantially horizontal plane (not shown in the Figures).

Figure 4:
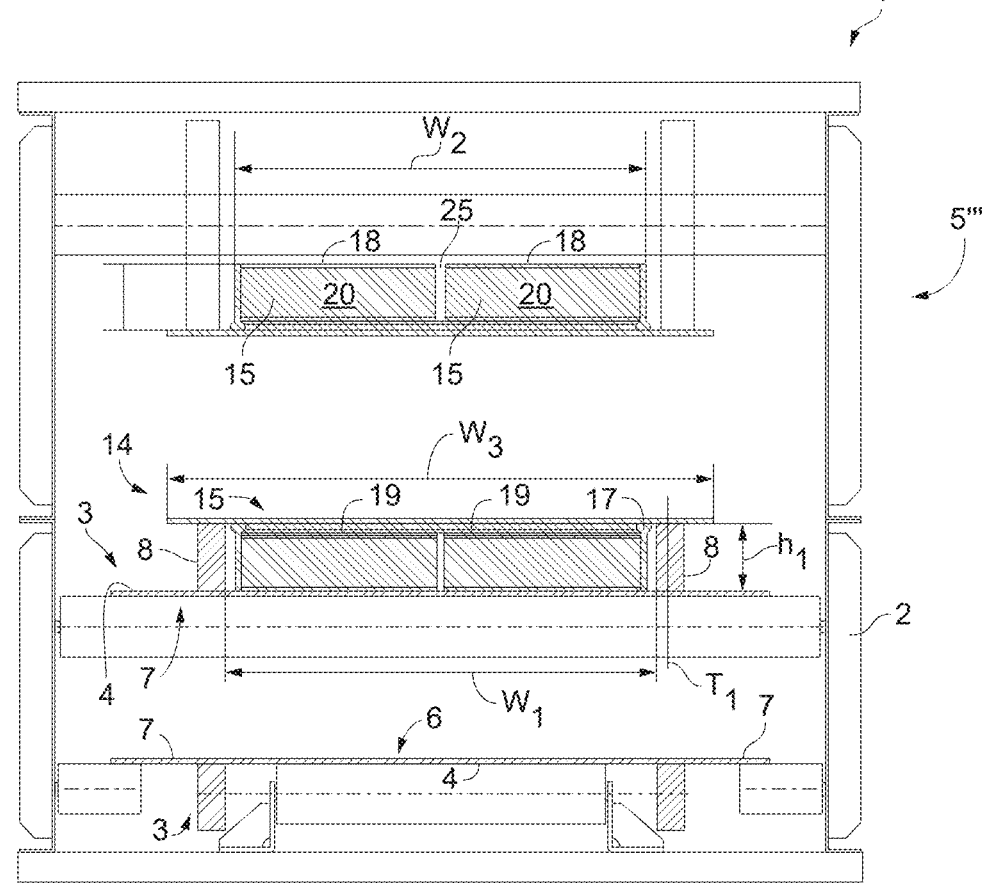
FIG. 4 shows a cross sectional view of the conveyor belt of FIG. 1 along the transverse section plane I-I.

Conveniently, as can be better seen in FIG. 4, which shows a cross sectional view of the elevator belt 1, the first surface 4 of the first transport element 3 can have a central portion 6 suited to come into contact (or to interact) with the material to be transported M.

In other words, the configuration and the extension of the first surface 4 of the first transport element 3 are selected in such a way as to allow the material loaded on the belt 5 to be spontaneously distributed (or accumulated) on the central portion 6, leaving the side terminal areas 7 of the first transport element 3 substantially free.

Furthermore, the first transport element 3 can be provided with one pair of substantially parallel terminal edges 8 that extend upwards from the first flat surface 4.

These edges 8 can extend along respective transverse directions of extension T that are substantially orthogonal to the first flat surface 4 and can have the same predetermined height $h_1$.

The terminal edges 8 can be positioned in such a way as to delimit the central portion 6 of the first flat surface 4 of the first transport element 3.

The presence of the terminal edges 8 makes it easier to hold (or contain) the material within the central portion 6 during the operation of the handling means 9 so as to prevent the material itself from coming out at the ends 7 of the first flat surface 4.

Conveniently, as better visible in FIG. 4, the central portion 6 of the first surface 4 can have a predetermined width $w_1$.

For example, the width $w_1$ of the central portion 6 can be included between 500 mm and 1000 mm, but its dimensions do not necessarily need to be within the above mentioned range, since the belt that is the subject of the present invention can have a wide range of configurations with different sizes which, among other things, make it possible to provide versions of the belt suited to adapt to the flow rate and grain size of the material to be transported, even when these are very high.

Handling means 9 anchored to the supporting structure 2 are also provided.

Said handling means 9 are suited to promote the controlled movement of the first transport element 3 along a predetermined direction of advance A, indicated by an arrow in the figures.

In particular, the handling means 9 are configured to promote the movement of the first transport element 3 along a direction of advance A substantially parallel to the longitudinal extension direction L of the first flat surface 4.

The handling means 9 can be provided with a plurality of electric motors connected to transmission members (not shown in the Figures) that are operatively associated with the flat surface 4 of the first transport element 3.

For example, the transmission members can consist of a plurality of motor-driven rollers interacting with the first surface 4 of the first transport element 3.

The controlled rotation of said rollers makes it possible to promote the advance, along the direction A, of the portion of the first surface 4 that constitutes the upper course P1 from the loading area Zc to the unloading area Zs.

The rotation of said rollers also makes it possible to promote the return of the portion of first surface 4 that constitutes the lower course P2 along a direction opposite the direction of advance A connecting the unloading area Zs to the loading area Zc.

Conveniently, the rollers can be replaced by different motion transmission members such as, for example, reduction gears acting on gear wheels and chains, pulleys and driving belts, kinematic mechanisms with gears and other similar elements.

According to the peculiar aspect of the invention, the belt 1 comprises a second transport element 14 intended to be positioned over at least one portion of said first transport element 3. In the following description, the expression "be positioned over" associated with the second transport element 14 must be understood as having the same meaning as "be coupled with" as the first and the second transport element are configured to mutually interact with each other.

In particular, the second transport element 14 extends along the longitudinal direction L and is configured to be coupled with a portion of the first flat surface 4 of the first transport element 3.

As better visible in FIG. 1, the second transport element 14 can be configured to be coupled at least with the vertical section 5″ of the first transport element 3.

The horizontal sections 5′, 5″ of the first transport element 3 can, instead, be free with respect to the second transport element 14 (the second transport element 14 does not extend over said sections), which means that the latter can have a limited extension with respect to the first transport element 3, so as not to interact with these sections.

In fact, in a configuration of the invention not shown in the Figures, the extension of the second transport element 14 can be selected so that it can be coupled with the portion of the first surface 4 suited to define the upper course P1, that is, only the portion of the first surface 4 intended to promote the advance of the material from the loading area Zc to the unloading area Zs along the direction A.

Conveniently, the second transport element 14 is provided with a plurality of crosspieces 15 intended to be coupled with the upper side of the first flat surface 4 of the first transport element 3.

In the present description, the term "crosspiece" indicates a substantially flat and straight element that extends along a transverse direction T2; in particular, this element is substantially orthogonal to the flat surface 4 of the first transport element 3.

Conveniently, the crosspiece 15 can also be orthogonal to the extension directions T1 of the pair of terminal edges 8 possibly formed on the first surface 4 of the first transport element 3. In this way, the crosspiece 15 is substantially orthogonal also to the first surface 4 of the first transport element 3.

In a different configuration of the belt, not illustrated in the Figures, the crosspiece 15 can be coupled with the first surface 4 in such a way that they form a predetermined angle of incidence a different from a right angle (for example, an angle of incidence between 70° and 105°).

In the embodiment illustrated in the Figures, and in particular visible in the sectional view of FIG. 1, the second transport element 14 can consist of a corresponding element in the shape of a substantially closed belt extending between two ends 22, 23.

More specifically, the second transport element 14 can have a second flat surface 17, suited to define a course in the shape of a substantially closed loop, from which the crosspieces 15 extend.

The second flat surface 17 of the second transport element 14 can be positioned over the first flat surface 4 of the first transport element 3.

The crosspieces 15 can be distributed both evenly and unevenly along the entire closed extension of the second surface 17.

More specifically, in the configuration of the belt illustrated in the Figures, the crosspieces 15 can be spaced with a substantially constant pitch p along the extension of the second surface 17.

Alternatively, the pitch p of the crosspieces 15 can vary along the extension of the second surface 17.

The second surface 17 can move along two substantially parallel courses P3, P4 both located over the first transport element 3.

The course P4 is the one that is at a shorter distance from the first transport element 3. Therefore, the coupling between the two transport elements 3, 14 can only take place on said course P4.

The course P3 is the one that is at a greater distance from the first transport element 3. Therefore, no coupling takes place between the two transport elements 3, 14 on said course P3.

In the remainder of the present description, the course P4 is referred to as the "lower course", while the course P3 is referred to as the "upper course".

In addition to the above, in the course P4 the second surface 17 and the crosspieces 15 move along the direction of advance A, while in the course P3 the second surface 17 and the crosspieces 15 move along an opposite direction with respect to the direction of advance A.

Conveniently, the handling means 9 can be configured to promote the controlled movement not only of the first transport element 3, but also of the second transport element 14.

Also in this case, suitable motion transmission members can be provided, which are suited to operatively connect the electric motors with the second transport element 14. In this way, the handling means 9 are suited to transmit simultaneous and synchronized motion to each transport element 3, 14. These transport elements 3, 14, therefore, are both motor-driven, so that they can move independently of each other.

In addition, the handling means 9 can be suited to promote the movement of the first transport element 3 and of the second transport element 14 (along their respective courses P1 and P4) substantially at the same advance speed.

In other words, the first transport element 3 and the second transport element 14 move along the advance direction A simultaneously, at a relative speed that is substantially equal to zero.

The crosspieces 15 have the function to interact with the material M placed on the central portion 6 of the first transport element 3 in such a way as to prevent it from falling during the advance of the first element 3 along the vertical section 5″.

In this way, the crosspiece 15 acts as a "partition element", that is, it allows the material M placed on the first surface 4 to rest on it during its progressive upward movement from the loading area Zc towards the unloading area Zs.

Furthermore, the presence of the crosspieces 15 prevents the material M from falling or rolling downwards during the advance along the vertical section 5′ ″.

Conveniently, each crosspiece 15 can have a free edge 18 lying substantially crosswise and parallel to the first surface 4.

In the coupling condition, the free edge 18 can be positioned in proximity to the first flat surface 4 of the first transport element 3.

In particular, the free edge 18 of the crosspiece 15 can be substantially in contact with the surface 4 of the first transport element 3.

The free edge 18 of the crosspiece 15 can interact with the first surface 4 in such a way as to exert a predetermined pressure on it.

Said pressure makes it possible to temporarily increase the mechanical rigidity of the crosspiece 15, (partially) reducing its elasticity; this condition makes it possible to better counteract the weight force acting on the material M during its upward movement towards the unloading area Zs.

According to the configuration of the invention illustrated in the Figures, the crosspieces 15 are configured to be coupled with the first flat surface 4 at the central portion 6 of the latter.

For this reason, the overall width $w_2$ of each crosspiece 15 can be selected so that it matches (that is, so that it is substantially the same as) the width $w_1$ of the central portion 6 of the first surface 4.

With regard to the above example, which refers to the first surface 4, the overall width $w_2$ of each crosspiece 15 can be included between 500 mm and 1000 mm.

In the case where the second transport element 14 is provided with a second surface 17, the crosspieces 15 can have an edge 19 opposite the free edge and integral with the latter so as to form a single assembly with said surface 17.

Each crosspiece 15 can consist of two or more segments 20 placed side by side, each joined to the second surface 17 through the respective edge 19 opposite the free edge 18.

Each segment 20 can be separated from the next by a transverse cut 25 extending from the free edge 18 to a point in proximity to the opposite edge 19 (joined to the second surface 17).

In this way, each segment 20 is free to rotate (deform) slightly around the edge 19 joined to the second surface 17 independently of the segment 20 adjacent to it.

The division of the crosspiece 15 into segments 20 makes it possible to obtain better adaptation to the shape that the material to be transported M may take after being placed on the first surface 4. In this way, it is possible to support the material M safely and firmly as it passes through the vertical section 5".

In the embodiment of the belt 1 illustrated in FIG. 4, the crosspiece 15 extends along a substantially transverse direction (that is, perpendicular to the longitudinal axis along which the second transport element 14 extends) and comprises a pair of segments 20 positioned side by side (along said transverse direction) but separated from each other by the cut 25.

According to an alternative configuration of the belt 1, the crosspiece 15 can comprise a pair of segments 20 arranged along extension directions J, K that are inclined with respect to the longitudinal extension axis L along which the second transport element 14 extends.

More specifically, the extension direction J of a segment 20 can be inclined with respect to the direction L with a first predetermined inclination angle $\alpha$, while the extension direction K of the other segment 20 can be inclined with a second predetermined inclination angle $\beta$.

Figure 5:
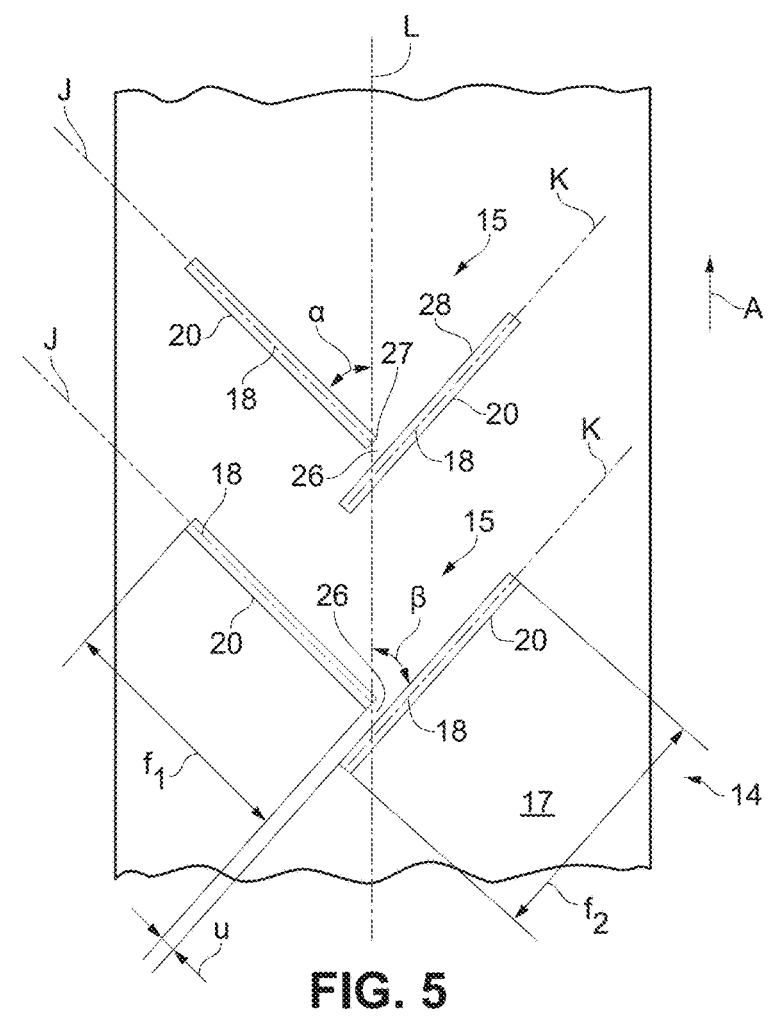
FIG. 5 shows a bottom view of a particular configuration of a component of the belt shown in FIG. 1.

The orientation of the directions J, K is selected in such a way that they converge towards the inside of the surface 17 of the second transport element 14, as visible in FIG. 5. More specifically, these segments 20 define a substantially V-shaped crosspiece 15 and oriented in such a way as to allow the collection and transport of the material M along the direction of advance A (as better illustrated in FIG. 5).

The first inclination angle $\alpha$ and the second inclination angle $\beta$ can be the same or different, typically the value of said angles $\alpha$, $\beta$ can be included between 15° and 60°.

The inclined segments 20 are not in contact with each other, on the contrary they are spaced by a slit indicated by the reference number 26 in FIG. 5.

The segments are arranged in such a way as to allow the formation of the slit 26; in particular, said slit 26 is obtained by positioning the segments in such a way that the final edge of one of them (for example, the final edge 27 of the crosspiece arranged on the left) faces and overlaps the external surface 28 of the other segment 20 (for example, the one arranged on the right).

Obviously, the arrangement of the segments 20 can also be complementary to that described above, meaning that the final edge 27 of the segment 20 arranged on the right can face and be spaced from the external surface 28 of the other segment 20 arranged on the left.

This overlapping condition does not define a contact between the segments 20, but rather the final edge 27 of a segment 20 remains spaced from the external surface 28 of the other segment 20, thus creating the slit 26.

By varying the distance between the final edge 27 of a segment 20 and the external surface 28 of the other segment 20, it is therefore possible to vary also the width u of the slit 26.

In addition, the lengths $f_1$ and $f_2$ of the segments 20 defining the crosspiece 15 can be the same or different from each other.

The arrangement of the segments along inclined directions J, K and the presence of the slit 26 allow the liquid part of the material M (for example, water) to be conveyed downwards, that is, towards the loading area Zc when the belt is set in operation.

However, the substantially V-shaped crosspiece 15, with a slit 26 at the vertex, defines a compulsory route for the liquid part, so as to slow it down while it is conveyed downwards.

The liquid part, in fact, flows out of a crosspiece 15 through the slit 26 obtained in the same, the liquid is then collected by the crosspiece 15 located immediately below thanks to the fact that the orientation of the "V" defined by said crosspiece 15 places the widest part facing the liquid (actually behaving like a funnel that collects the falling liquid). In this case, too, the liquid flows out of the slit 26 and is then collected by the crosspiece positioned deeper in the ground/even lower, thus repeating the conveyance scheme just described above.

Thanks to this specific method for conveying the liquid downwards, the speed and flow rate of the liquid part associated with the material M remain limited, so as to prevent the liquid itself from exerting such a driving force on the solid part of the same material M as to promote its detachment or exit from the transport elements 3, 14.

Conveniently, the height of each crosspiece $h_2$ can be selected so that it is equal (or substantially close) to the height $h_1$ of the terminal edges 8 extending from the first surface 4 of the first transport element 3. In this way, the free edge 18 of the crosspiece is substantially in contact with (or spaced by a reduced distance from) the first flat surface 4 when the transport elements 3, 14 are mutually coupled.

Furthermore, the overall width $w_3$ of the second surface 17 can be chosen so that it is greater than the width w of the central portion 6 of the first surface 4.

Thus, in this way, the second surface 17 is configured to completely cover the terminal edges 8 extending from the first surface 4 of the first transport element 3. In particular, the second surface 17 associated with the second transport element 14 comes into contact with the free end of the edges 8; in this configuration, the second surface totally covers the central portion 6 of the first transport element 3 extending between the pair of terminal edges 8.

The first transport element 3 and the second transport element 14 can be made of totally or partially flexible materials, for example rubber, polymeric material or the like.

In addition to the above, during the activation of the handling means 9 in the section where the two elements 3, 14 are coupled, a plurality of compartments 21 are formed, each of which is delimited longitudinally by two adjacent crosspieces 15 and transversally by the terminal edges 8 of the first transport element 3.

Furthermore, each compartment 21 is also closed at the top by the second surface 17 of the second transport element 14.

More specifically, these compartments are formed during the passage of the crosspieces 15 in the lower course P4.

The formation of the temporary compartments 21 makes it possible to better retain the material M to be transported as it passes through the vertical section 5' ".

The use of flexible materials for the construction of the first transport element 3 and the second transport element 14 has the advantage of obtaining compartments 21 with variable volume, capable of containing pieces of material M to be transported having different shapes.

In particular, the relative compliance and flexibility of the material from which the first 3 and/or the second transport element 14 are made allow the latter to at least partially assume the shape of the material M arranged inside the compartment 21 even when the height of said material M exceeds the height $h_1$ of the terminal edges 8 of the first transport element 3.

In this way, the first 3 and the second transport element 14 can define a compartment 21 with variable volume, creating "bulges" at the compartments 21 containing material M with relatively large dimensions and exceeding the height $h_1$.

However, the crosspieces 15 associated with the second transport element 14 define a support also for large-sized material M, thus preventing it from falling or moving backwards along the longitudinal direction L during the advance of the transport elements 3, 14 along the direction A.

Figure 6:
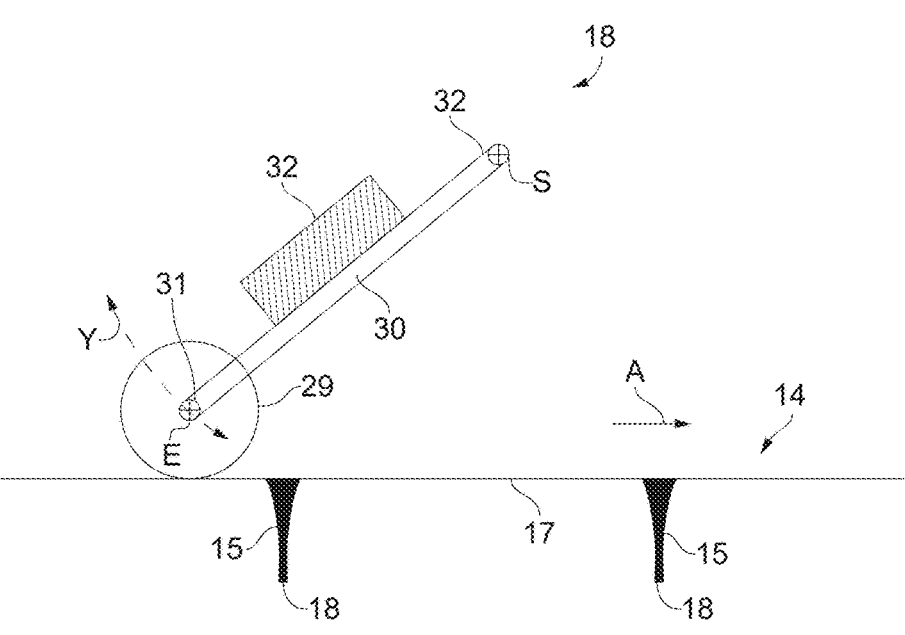
FIG. 6 shows a schematic side view of a further component of the belt shown in FIG. 1.

As schematically shown in greater detail in FIG. 6, the belt 1 comprises pressing means 28 acting on the second transport element 14 and suited to promote the mutual approach (or contact) between the second surface 17 and the ends of the edges 8 of the first transport element 3.

The pressing means 28 comprise a roller 29 revolving idly about a rotation axis E that is substantially transverse and orthogonal to the extension direction L of the second transport element 14.

However, said roller 29 oscillates in such a way as to adapt to the "bulges" (that is, the compartment 21 with variable volume) that can be created when the material M being transported is relatively large.

To permit the oscillation of the roller 29, a rectilinear rod 30 is provided, which has one end 31 connected to the roller 29 at its rotation axis E and an opposite end 32 hinged to a point S of the supporting structure 2.

The rod can thus rotate around the hinge point S so as to allow the roller 29 to move upwards/downwards along a trajectory Y when a bulge on the surface 17 of the second transport element 14 passes under it.

To promote the downward fall of the roller 29, a mass 32 having a predetermined value and anchored to the rod is used. The mass 32 acts as a counterweight which promotes the downward return movement of the roller 29 in order to exert, through the latter, a pressing action on the second transport element 14 to move it closer to the first transport element 3.

The downward return of roller 29 can also be achieved by using return elements substantially equivalent to the counterweight such as, for example, springs, linear actuators, cams etc.

In a different configuration of the invention, the second surface 17 of the second transport element 14 can be replaced by other similar elements having the function of supporting the crosspieces 15.

By way of example, the second surface 17 can be replaced by a net and/or a plurality of longitudinal and/or transverse strips etc.

In this case, the compartment 21 may not be closed in a substantially tight (or almost tight) manner at the top (since it has a mesh structure), but the component that replaces the second surface 17 can be defined with elements such as to define openings having predetermined dimensions selected in such a way as to prevent the material M from coming out.

In practice, it is possible to choose a net with thick meshes or to space the longitudinal and/or transverse strips so as to obtain a relatively dense pattern.

Also in this case, therefore, it is possible to ensure that the material M to be transported along the sections 5" can be handled while preventing it from falling down.

Conveniently, the conveyor belt that is the subject of the present invention can comprise a scraper element, not illustrated in the Figures, intended to interact with the flat surface 4 of the first transport element 3 so as to remove any residual material M adhering to it even after unloading at the unloading area Zs.

In particular, the scraper element can be installed in the horizontal section 5" of the first transport element 3; in this section, in fact, the flat surface 4 is free and can be accessed from the outside as it does not interact with the second transport element 14.

It is therefore possible to install a scraper element suited to interact with the entire extent of the flat surface 4 without any interaction between this component and the second transport element 14.

Thanks to this configuration and to the fact that there are no protrusions extending from the first transport element 3, it is possible to install a scraper element relatively easily while ensuring a high degree of cleanliness of the surface 4 of the first transport element 3.

The present invention can be carried out in other variants, all falling within the scope of the inventive features claimed and described herein; said technical features can be replaced by different technically equivalent elements and materials; the shapes and dimensions of the invention can be any as long as they are compatible with its use.

The reference numbers and signs included in the claims and in the description are only intended to make the text clearer to understand and must not be considered as elements limiting the technical interpretation of the objects or processes identified by them.

The invention claimed is:

1. An elevator conveyor belt configured to promote handling of materials consisting of heterogeneous elements, said elevator conveyor belt comprising:
   a supporting structure;
   a first transport element anchored to said supporting structure and having a first flat surface configured to support the material to be transported, said first flat surface extending continuously along a longitudinal extension direction between a loading area for the material to be transported and an unloading area for the transported material;

a handling system anchored to said supporting structure and configured to promote controlled movement of said first transport element along a predetermined advance direction substantially parallel to said longitudinal of said first flat surface, during the operation of said handling system, the material being loaded onto, and respectively unloaded from, said first transport element at said loading area, and respectively at said unloading area; and a second transport element disposed over at least one portion of said first transport element, said second transport element-being provided with a plurality of crosspieces substantially positioned crosswise and configured to be disposed over said first flat surface of said first transport element to interact with the material and guide the material while the material is transported from said loading area to said unloading area, each of the crosspieces having a free edge substantially positioned crosswise, the free edge being disposed in proximity to the first flat surface of the first transport element, the free edge of the crosspiece being configured to interact with the first flat surface to exert a predetermined pressure on the first flat surface.

2. The belt according to claim 1, wherein the free edge of each crosspiece of said plurality of crosspieces is substantially in contact with said first surface of said first transport element to completely hold the material placed thereon.

3. The belt according to claim 1, wherein said first surface has a central portion configured to interact with the material to be transported, said central portion having a predetermined width.

4. The belt according to claim 3, wherein said crosspieces of said second transport element are configured to overlap said first flat surface at said central portion.

5. The belt according to claim 3, wherein each of the crosspieces of said plurality of crosspieces has a width substantially equal to the width of the central portion of said first surface.

6. The belt according to claim 1, wherein said first transport element has a pair of substantially parallel terminal edges extending from said first flat surface along a transverse direction substantially orthogonal to the transverse extension direction defined by said crosspieces.

7. The belt according to claim 6, wherein said terminal edges are configured to delimit said central portion of said first flat surface of said first transport element.

8. The belt according to claim 7, wherein the height of said terminal edges of said first transport element is substantially equal to the height that of one or more crosspieces of said plurality of crosspieces.

9. The belt according to claim 1, wherein said second transport element has a second flat surface positioned over said first flat surface of said first transport element.

10. The belt according to claim 9, wherein said second flat surface is substantially parallel to said first flat surface.

11. The belt according to claim 10, wherein each of the crosspieces of said plurality of crosspieces is joined to said second flat surface at a terminal edge to form a single assembly together with said second flat surface.

12. The belt according to claim 9, wherein said second flat surface has a predetermined width that is greater than the width of said central portion of said first flat surface, said second flat surface being configured to completely cover each of said terminal edges of said first transport element.

13. The belt according to claim 1, wherein said handling system is configured to promote a controlled movement of said second transport element.

14. The belt according to claim 13, wherein said handling system is configured to promote a movement of said first transport element and the movement of said second transport element substantially at the same advance speed, said first transport element and said second transport element being configured to be moved along the advance direction at a relative speed substantially equal to zero.

* * * * *